(12) United States Patent
Hornung

(10) Patent No.: US 12,263,717 B2
(45) Date of Patent: Apr. 1, 2025

(54) AIR OUTLET, HEATER OR AIR CONDITIONING UNIT WITH SUCH AN AIR OUTLET, RECREATIONAL VEHICLE WITH AN AIR OUTLET, HEATER AND/OR AIR CONDITIONING UNIT AND METHODS FOR ATTACHING, OPERATING AND CONVERTING AN AIR OUTLET

(71) Applicant: Dometic Sweden AB, Solna (SE)

(72) Inventor: Herr Dirk Hornung, Münster (DE)

(73) Assignee: Dometic Sweden AB, Solna (SE)

( * ) Notice: Subject to any disclaimer, the term of this patent is extended or adjusted under 35 U.S.C. 154(b) by 241 days.

(21) Appl. No.: 17/369,378

(22) Filed: Jul. 7, 2021

(65) Prior Publication Data

US 2022/0009306 A1 Jan. 13, 2022

(30) Foreign Application Priority Data

Jul. 9, 2020 (DE) .......................... 102020208653.2

(51) Int. Cl.
*B60H 1/00* (2006.01)
(52) U.S. Cl.
CPC ..... *B60H 1/00678* (2013.01); *B60H 1/00857* (2013.01); *B60H 1/00871* (2013.01); *B60H 1/00364* (2013.01)
(58) Field of Classification Search
CPC ............ B60H 1/00678; B60H 1/00857; B60H 1/00871; B60H 1/00364; B60H 1/3421; B60H 2001/3464
USPC ......................................................... 454/69
See application file for complete search history.

(56) References Cited

U.S. PATENT DOCUMENTS

| D226,381 S | 2/1973 | Harty, Jr. |
| D284,025 S | 5/1986 | Armstrong |
| 4,641,502 A | 2/1987 | Aldrich |
| 4,672,818 A | 6/1987 | Roth |

(Continued)

FOREIGN PATENT DOCUMENTS

| AU | 2004202967 | 3/2011 |
| AU | 2007200788 | 9/2011 |

(Continued)

OTHER PUBLICATIONS

Design U.S. Appl. No. 29/715,592, filed Dec. 3, 2019 titled Filter Housing.

(Continued)

*Primary Examiner* — Allen R. B. Schult
*Assistant Examiner* — William C Weinert
(74) *Attorney, Agent, or Firm* — Dinsmore & Shohl LLP

(57) ABSTRACT

An air outlet, in particular for heaters or air conditioning units for recreational vehicles like campers or caravans, having a main housing, a flap suitable to seal the air flow channel in the main housing and a coupling mechanism. The main housing forms an air flow channel and the coupling mechanism couples the flap to the main housing in a movable manner such that the flap can be moved with respect to the main housing between a closed state, in which the flap seals the air flow channel, and an opened state, in which the flap does not seal the air flow channel. The coupling mechanism is configured such that the flap conducts a rotating and sliding movement with respect to the main housing when being moved between the closed state and the opened state.

16 Claims, 6 Drawing Sheets

(56) References Cited

U.S. PATENT DOCUMENTS

| | | | |
|---|---|---|---|
| 4,709,623 | A | 12/1987 | Roth |
| D300,777 | S | 4/1989 | Bales |
| D306,341 | S | 2/1990 | Bales |
| 5,531,641 | A | 7/1996 | Aldrich |
| 5,848,536 | A | 12/1998 | Dodge |
| 6,116,095 | A | 9/2000 | Radle |
| 6,213,197 | B1 | 4/2001 | Ebbeson |
| 6,263,689 | B1 | 7/2001 | Dodge |
| 6,449,973 | B2 | 9/2002 | Dodge |
| 6,857,953 | B2 | 2/2005 | Malott |
| 7,140,192 | B2 | 11/2006 | Allen |
| 7,171,822 | B2 | 2/2007 | Allen |
| 7,234,315 | B2 | 6/2007 | Allen |
| 7,237,397 | B2 | 7/2007 | Allen |
| 7,316,119 | B2 | 1/2008 | Allen |
| 7,419,368 | B2 | 9/2008 | Milks |
| D588,479 | S | 3/2009 | Giese |
| 7,739,882 | B2 | 6/2010 | Evans |
| 7,963,117 | B2 | 6/2011 | Allen |
| 8,056,351 | B2 | 11/2011 | Marciano |
| D661,386 | S | 6/2012 | Bergin |
| 8,240,168 | B2 | 8/2012 | Holguin |
| 8,440,143 | B2 | 5/2013 | Liptak |
| 8,535,127 | B2 | 9/2013 | Malott |
| 8,568,209 | B2 | 10/2013 | Boxum |
| D712,531 | S | 9/2014 | Bergin |
| D715,907 | S | 10/2014 | Bergin |
| D716,925 | S | 11/2014 | Bergin |
| 9,631,832 | B2 | 4/2017 | Malott |
| D785,771 | S | 5/2017 | Bergin |
| D785,772 | S | 5/2017 | Bergin |
| 9,651,284 | B2 | 5/2017 | Esch |
| D795,712 | S | 8/2017 | Bergin |
| D811,566 | S | 2/2018 | Liu |
| D817,466 | S | 5/2018 | Moseley |
| 9,975,405 | B2 | 5/2018 | Siddiqui |
| D824,499 | S | 7/2018 | Williamson |
| 10,082,345 | B1 | 9/2018 | Mihail |
| 10,093,152 | B2 | 10/2018 | Allard |
| D841,138 | S | 2/2019 | Williamson |
| D850,609 | S | 6/2019 | Bergin |
| D862,668 | S | 10/2019 | Moseley |
| D865,926 | S | 11/2019 | Moseley |
| 10,589,593 | B2 | 3/2020 | Westendarp |
| D884,870 | S | 5/2020 | Bergin |
| 10,675,941 | B2 | 6/2020 | Williamson |
| 10,696,129 | B2 | 6/2020 | Bergin |
| D905,217 | S | 8/2020 | Hederstierna |
| D907,183 | S | 1/2021 | Meda |
| 10,941,955 | B2 | 3/2021 | Heral |
| D915,569 | S | 4/2021 | Meda |
| D917,036 | S | 4/2021 | Hederstierna |
| 11,034,208 | B2 | 6/2021 | Williamson |
| D940,289 | S | 1/2022 | Hederstierna |
| 2006/0052050 | A1 | 3/2006 | Malott |
| 2007/0227693 | A1 | 10/2007 | Allen |
| 2008/0112155 | A1* | 5/2008 | Scown ............... B60Q 3/44 362/96 |
| 2008/0202138 | A1 | 8/2008 | Pabisz |
| 2009/0209193 | A1 | 8/2009 | Kloster |
| 2013/0205811 | A1 | 8/2013 | Esch |
| 2014/0223928 | A1 | 8/2014 | Esch |
| 2019/0047353 | A1 | 2/2019 | Williamson |
| 2019/0047354 | A1 | 2/2019 | Williamson |
| 2019/0128551 | A1 | 5/2019 | Heral |
| 2019/0315197 | A1 | 10/2019 | Williamson |
| 2020/0148028 | A1 | 5/2020 | Westendarp |
| 2020/0198438 | A1 | 6/2020 | Liu |
| 2020/0298655 | A1 | 9/2020 | Williamson |
| 2020/0338951 | A1 | 10/2020 | Paci |
| 2021/0061054 | A1 | 3/2021 | Meda |
| 2021/0061058 | A1 | 3/2021 | Meda |
| 2021/0061060 | A1 | 3/2021 | Meda |
| 2021/0207882 | A1 | 7/2021 | Jurek |
| 2021/0239105 | A1 | 8/2021 | Allard |
| 2021/0276396 | A1 | 9/2021 | Jurek |
| 2021/0354526 | A1 | 11/2021 | Williamson |
| 2022/0001718 | A1 | 1/2022 | Jurek |
| 2022/0009306 | A1 | 1/2022 | Hornung |

FOREIGN PATENT DOCUMENTS

| | | |
|---|---|---|
| AU | 2007237183 | 12/2012 |
| AU | 2009233601 | 1/2013 |
| AU | 2007202766 | 11/2013 |
| AU | 354553 | 3/2014 |
| AU | 2012261549 | 8/2015 |
| AU | 367405 | 3/2016 |
| AU | 201612249 | 3/2016 |
| AU | 201613590 | 7/2016 |
| AU | 201613591 | 7/2016 |
| AU | 201613592 | 7/2016 |
| AU | 201613593 | 7/2016 |
| AU | 2016101949 | 12/2016 |
| AU | 2017100215 | 3/2017 |
| AU | 201712794 | 5/2017 |
| AU | 201712798 | 5/2017 |
| AU | 2017200186 | 8/2017 |
| AU | 201810968 | 3/2018 |
| AU | 201810969 | 3/2018 |
| AU | 201810970 | 3/2018 |
| AU | 201810971 | 3/2018 |
| AU | 201810972 | 3/2018 |
| AU | 201810973 | 3/2018 |
| AU | 201810975 | 3/2018 |
| AU | 201810977 | 3/2018 |
| AU | 201810978 | 3/2018 |
| AU | 201816419 | 1/2019 |
| AU | 201910037 | 2/2019 |
| AU | 201910038 | 2/2019 |
| AU | 201911094 | 4/2019 |
| AU | 201912125 | 6/2019 |
| AU | 2017364256 | 6/2019 |
| AU | 2019202512 | 10/2019 |
| AU | 201915241 | 12/2019 |
| AU | 201916406 | 12/2019 |
| AU | 201916408 | 12/2019 |
| AU | 201916409 | 12/2019 |
| AU | 2018366469 | 5/2020 |
| AU | 202016120 | 1/2021 |
| AU | 202016121 | 1/2021 |
| AU | 202016122 | 1/2021 |
| AU | 202016123 | 1/2021 |
| CA | 2518348 | 3/2006 |
| CA | 2578651 | 8/2007 |
| CA | 2587994 | 12/2007 |
| CA | 2611822 | 5/2008 |
| CA | 2686403 | 5/2010 |
| CA | 2906348 | 9/2014 |
| CA | 2951956 | 12/2015 |
| CA | 2954152 | 1/2016 |
| CA | 165232 S | 5/2016 |
| CA | 165233 S | 5/2016 |
| CA | 167431 S | 2/2017 |
| CA | 172872 S | 2/2017 |
| CA | 172873 S | 2/2017 |
| CA | 172874 S | 2/2017 |
| CN | 103237671 A | 8/2013 |
| CN | 103687735 A | 3/2014 |
| CN | 106470856 A | 3/2017 |
| CN | 304097003 S | 4/2017 |
| CN | 106976376 A | 7/2017 |
| CN | 109070688 A | 12/2018 |
| CN | 305029216 S | 2/2019 |
| CN | 305029217 S | 2/2019 |
| CN | 305029218 S | 2/2019 |
| CN | 305105066 S | 4/2019 |
| CN | 110293813 A | 10/2019 |
| CN | 110385958 A | 10/2019 |
| CN | 305397384 S | 10/2019 |
| CN | 111344168 A | 6/2020 |
| CN | 213237518 | 5/2021 |
| CN | 213237945 | 5/2021 |
| CN | 306672354 S | 7/2021 |

(56) References Cited

FOREIGN PATENT DOCUMENTS

| | | |
|---|---|---|
| CN | 306681352 S | 7/2021 |
| CN | 306901266 S | 10/2021 |
| DE | 19654261 | 6/1998 |
| DE | 69503723 | 9/1998 |
| DE | 19730136 | 1/1999 |
| DE | 69817899 | 10/2003 |
| DE | 10255833 | 6/2004 |
| DE | 10336767 | 12/2004 |
| DE | 59812376 | 1/2005 |
| DE | 202004007924 | 11/2005 |
| DE | 202005013530 | 12/2005 |
| DE | 202004017266 | 4/2006 |
| DE | 202005000560 | 6/2006 |
| DE | 102005030362 | 11/2006 |
| DE | 602004004480 | 3/2007 |
| DE | 202006001374 | 7/2007 |
| DE | 202006001376 | 7/2007 |
| DE | 202006001377 | 7/2007 |
| DE | 202006009803 | 12/2007 |
| DE | 202007006292 | 10/2008 |
| DE | 102007038716 | 2/2009 |
| DE | 602005012194 | 2/2009 |
| DE | 202009000012 U1 | 4/2009 |
| DE | 202008003123 | 9/2009 |
| DE | 102008028066 | 12/2009 |
| DE | 602007009584 | 11/2010 |
| DE | 502007006725 | 4/2011 |
| DE | 202011101256 | 12/2011 |
| DE | 202010012578 | 2/2012 |
| DE | 102011002606 A1 * | 7/2012 ......... B60H 1/00671 |
| DE | 202011002986 | 7/2014 |
| DE | 202013004158 | 9/2014 |
| DE | 102016220768 | 4/2018 |
| DE | 112017000915 | 10/2018 |
| DE | 102017207797 | 11/2018 |
| DE | 102017214941 | 2/2019 |
| DE | 102017219353 | 5/2019 |
| DE | 112017005541 | 8/2019 |
| DE | 102018204532 | 9/2019 |
| DE | 102018206490 | 10/2019 |
| DE | 102019205194 | 10/2019 |
| DE | 102018206854 | 11/2019 |
| DE | 112018003284 | 3/2020 |
| DE | 202015009786 | 3/2020 |
| DE | 212018000248 | 3/2020 |
| DE | 212018000249 | 3/2020 |
| DE | 112018003288 | 4/2020 |
| DE | 102018222877 | 6/2020 |
| DE | 102018222877 A1 | 6/2020 |
| DE | 112018005002 | 7/2020 |
| DE | 112018005883 | 7/2020 |
| DE | 102020203424 | 7/2021 |
| DE | 112020000265 | 9/2021 |
| DE | 102020206181 | 11/2021 |
| DE | 102020206182 | 11/2021 |
| DE | 102020206183 | 11/2021 |
| EP | 700801 | 3/1996 |
| EP | 0810112 A2 | 12/1997 |
| EP | 869018 | 10/1998 |
| EP | 892225 | 1/1999 |
| EP | 1538009 | 6/2005 |
| EP | 1634740 | 3/2006 |
| EP | 1721765 | 11/2006 |
| EP | 1752717 | 2/2007 |
| EP | 1826041 | 8/2007 |
| EP | 1870270 | 12/2007 |
| EP | 1925889 | 5/2008 |
| EP | 1955946 | 8/2008 |
| EP | 1988612 | 11/2008 |
| EP | 2189312 | 5/2010 |
| EP | 2192040 | 6/2010 |
| EP | 2196390 | 6/2010 |
| EP | 2433658 | 3/2012 |
| EP | 2665611 | 10/2014 |
| EP | 2178710 | 11/2015 |
| EP | 2616258 | 2/2016 |
| EP | 3113965 | 1/2017 |
| EP | 3241695 | 4/2018 |
| EP | 2714440 | 5/2018 |
| EP | 2994326 | 7/2018 |
| EP | 3401619 | 11/2018 |
| EP | 3411250 | 12/2018 |
| EP | 3476630 | 5/2019 |
| EP | 3543047 | 9/2019 |
| EP | 3564564 | 11/2019 |
| EP | 3592585 | 7/2021 |
| JP | 11115475 A * | 4/1999 |
| JP | H11115475 A | 4/1999 |
| RU | 2753994 C2 | 8/2021 |
| WO | 2009021994 A1 | 2/2009 |
| WO | 2012034695 A1 | 3/2012 |
| WO | 2012113538 A1 | 8/2012 |
| WO | 2012159749 A1 | 11/2012 |
| WO | 2014143181 A1 | 9/2014 |
| WO | 2014180559 A1 | 11/2014 |
| WO | 2017143393 A1 | 8/2017 |
| WO | 2017143394 A1 | 8/2017 |
| WO | 2018096127 A1 | 5/2018 |
| WO | 2019038023 A1 | 2/2019 |
| WO | 2019082168 A1 | 5/2019 |
| WO | 2019097448 A1 | 5/2019 |
| WO | 2019207451 A2 | 10/2019 |
| WO | 2019229706 A1 | 12/2019 |
| WO | 2019244011 A1 | 12/2019 |
| WO | 2020143636 A1 | 7/2020 |
| WO | 2020151541 A1 | 7/2020 |
| WO | 2020169204 A1 | 8/2020 |
| WO | 2020188485 A2 | 9/2020 |
| WO | 2020192746 A1 | 10/2020 |
| WO | 2021074841 | 4/2021 |
| WO | 20210186414 | 9/2021 |
| WO | 2021228601 A1 | 11/2021 |
| WO | 2021228605 A1 | 11/2021 |
| WO | 2021228620 A1 | 11/2021 |

OTHER PUBLICATIONS

Design U.S. Appl. No. 29/758,314, filed Nov. 13, 2020 titled Air Conditioning Apparatus.
Dometic Product Catalog—Climate Control. 2015.
Dometic Product Catalog—Climate Control. 2016.
Office Action Mailed in DE Patent Application No. 102020208653.2 mailed on Oct. 17, 2023.
10-Minute Tech, Trailer Life, Jul. 1996, pp. 69-70 dated Jul. 1, 1996.
American RV Company, Dometic 459530 Duo Therm 13,500 BTU Brisk Air Conditioner High Efficiency Upper Unit Trailer Camper RV, Mar. 23, 2014, https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014.
American RV Company, Dometic 541815 High Performance 13,500 BTU Air Conditioner Upper Unit CCC2 Required Electronics Pre-Installed Camper Trailer RV, https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.

(56) References Cited

OTHER PUBLICATIONS

American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
Dirna Bergstrom: Slim Cool; http://www.dirna.com/files/dirna-manuals/220RE00183.pdf May 21, 2014.
Dometic Corporation, Dometic High Performance Air Conditioners, 2 pages, Jan. 1, 2011.
Dometic Duo-Therm, p. 140, Feb. 23, 2013.
Dometic Group: "Climate Control", http://www.dometic.com/enus/Americas/USA/RV-Products/climate, 2 pages.
Dometic Waeco Coolair RT 880; http://www.dometic.co.uk/product/waeco-coolair-rt-880-2/ May 14, 2015.
Eberspacher Cooltronic Parking Coolers with High Efficiency with the Engine Off; http://www.eberspacher.com/products/air-conditioning/cooltronic-truck-parking-coolers.html Jun. 23, 2015.
Indelb; WO Oblo; Sleeping Well Oblo; http://www.indelb.com/products/parking_air_cooler/sleeping_well/sw_oblo Apr. 1, 2016.
Webasto: Rooftop air conditioning systems: Rooftop 3.5-9.9 kw; https://web.archive.org/web/20161201014045/https://www.webasto.com/au/markets-products/off-highway/air-conditioning/rooftop-air-conditioning/rooftop-ac-35-99-kw/.
Webasto; Truck parking cooler: Cool Top Vario 10 E; http://www.webasto.com/gb/marketsproducts/truck/air-conditioning/products/cool-top-vario/ Apr. 25, 2016.
Youtube; Viesa Kompressor; https://www.youtube.com/watch?v=SPK17XEvVLO May 22, 2012 (https://www.google.com/?gws_rd=ssl#q=https://www.youtube.com/watch?v%3DSPK17XEvVL0&spf=1495819902591).
Dirna Bergstrom: Parking Coolers—No-Idle Electrical A/C—MiniCool Compact 1.4; http://www.dirna.com/parking-coolers-no-idle-electrical-ac-compact/ Mar. 17, 2015.
Design U.S. Appl. No. 29/760,605, filed Dec. 2, 2020.
U.S. Appl. No. 63/141,800, filed Jan. 26, 2021 titled Air Conditioning System for a Vehicle.
Design U.S. Appl. No. 29/767,929, filed Jan. 26, 2021 titled Air Conditioner Housing.
Design U.S. Appl. No. 29/774,535, filed Mar. 17, 2021 titled Air Distribution Box.
U.S. Appl. No. 63/175,304, filed Apr. 1, 2021.
U.S. Appl. No. 62/819,711, filed Mar. 18, 2019 titled Mobile Air Conditioner.
U.S. Appl. No. 17/579,442, filed Jan. 19, 2022 titled "Heating Arrangement and Heat Distribution Unit for Such a Heating Arrangement".
U.S. Appl. No. 17/673,080, filed Feb. 16, 2022 titled "Recreational Vehicle, Cooling Device, Controlling System and Method for Controlling the Cooling Device".
Design U.S. Appl. No. 29/826,755, filed Feb. 15, 2022 titled "Housing".
Design U.S. Appl. No. 29/826,757, filed Feb. 15, 2022 titled "Housing".
U.S. Appl. No. 17/440,104, filed Sep. 16, 2021 titled "Mobile Air Conditioner".
DE Patent Application No. 102020208653.2 titled "Air outlet, heater or air conditioning unit with such an air outlet, recreational vehicle with an air outlet, heater and/ or air conditioning unit and methods for attaching, operating and converting an air outlet" filed on Jul. 9, 2020.
Office Action Mailed in DE Patent Application No. 102020208653.2 mailed on Feb. 16, 2021.

\* cited by examiner

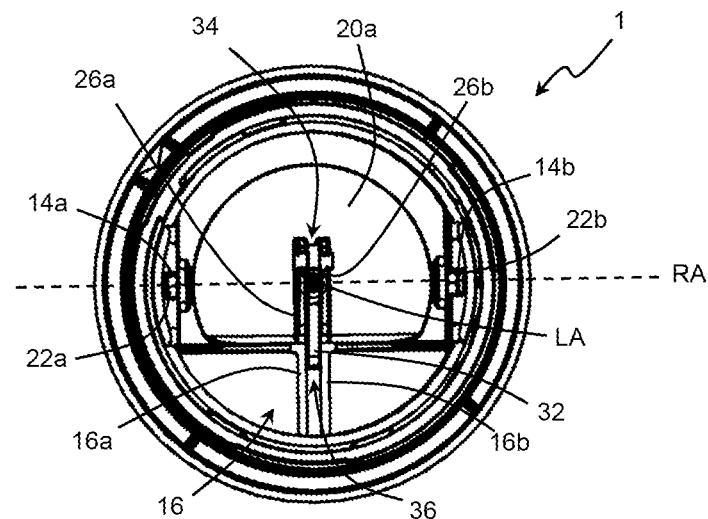
FIG. 3
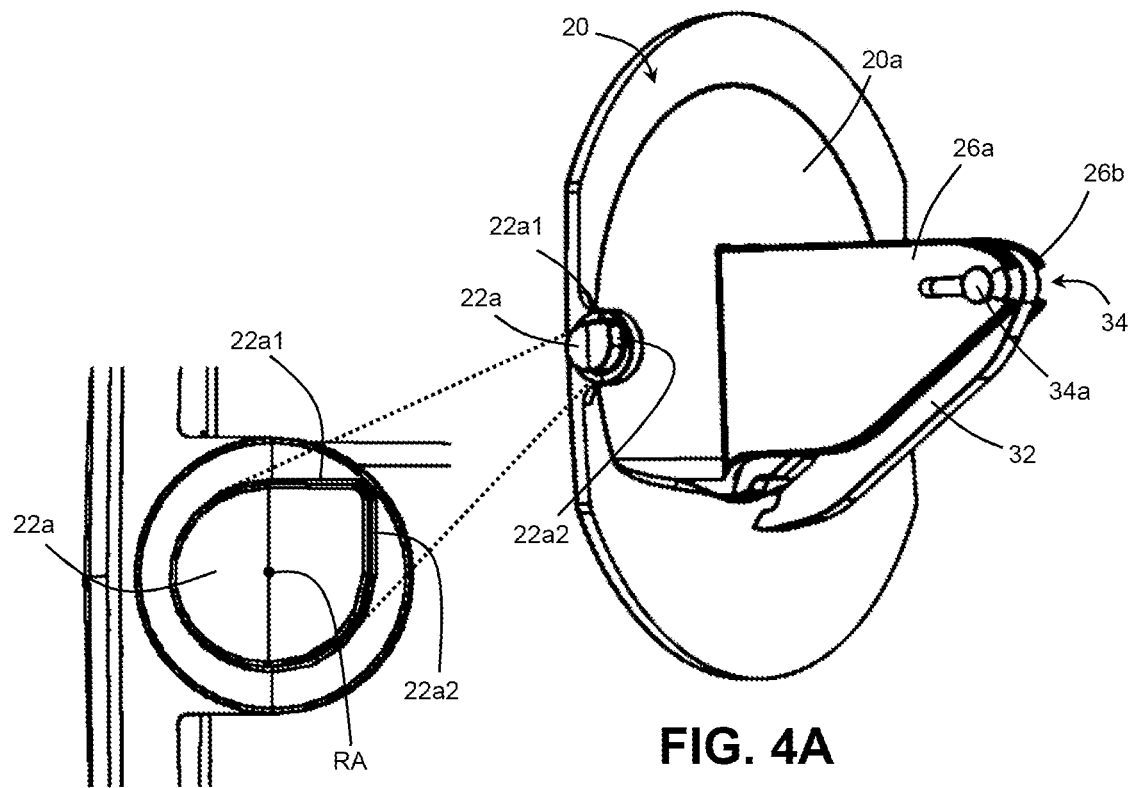
FIG. 4A
FIG. 4B

AIR OUTLET, HEATER OR AIR CONDITIONING UNIT WITH SUCH AN AIR OUTLET, RECREATIONAL VEHICLE WITH AN AIR OUTLET, HEATER AND/OR AIR CONDITIONING UNIT AND METHODS FOR ATTACHING, OPERATING AND CONVERTING AN AIR OUTLET

CLAIM TO PRIORITY

This non-provisional patent application claims priority to and benefit of, under 35 U.S.C. § 119(a), German Patent Application Serial Number DE 102020208653.2, filed Jul. 9, 2020, all of which is incorporated by reference herein.

BACKGROUND

The present embodiments relate to an air outlet, a heater or air conditioning unit with such an air outlet, a recreational vehicle with an air outlet, heater and/or air conditioning unit and methods for attaching, operating and converting an air outlet.

Various configurations for air outlets, in particular for air outlets for heaters or air conditioning units for recreational vehicles like campers or caravans are known. Common air outlets are provided with a main housing, a flap and a coupling mechanism. The main housing forms an air flow channel. The flap is suitable to seal the air flow channel within the main housing and the coupling mechanism is coupling the flap to the main housing in a movable manner such that the flap can be moved with respect to the main housing. The flap can be moved between a closed state, in which the flap seals the air flow channel, and an opened state, in which the flap does not seal the air flow channel. Thus, the air outlet can be closed and opened depending on the users' needs.

As such air outlets in recreational vehicles are usually mounted near to the floor in the furniture, there are specific demands to be fulfilled by the air outlet. On the one hand, an operation of the air outlet, that means a movement of the flap between its opened state and its closed state, must be easy to use for the user and reliable in its intended function. On the other hand, the air outlet and in particular the provided flap and the coupling mechanism has to be protected against impact by external impact, for example by feet, heels and/or shoes of people being inside the recreational vehicle. In view of this, the air outlet should be provided in such a manner that neither the flap nor the coupling mechanism protrudes from the main housing in the opened state of the flap and in the closed state, the front side of the air outlet should form a substantially flat and even surface. Such configurations are very robust.

SUMMARY

Currently, no configurations solving all these problems and fulfilling the therefrom generated demands in a satisfying manner are known.

Accordingly, it is the task of the present embodiments to provide an air outlet solving the above problems and fulfilling the thereto related demands in a satisfactory manner.

This problem is solved by the air outlet according to claim 1. The dependent claims refer to optional modifications for such an air outlet, specific devices and or vehicles provided with such an air outlet and various methods related to such an air outlet.

According to a first aspect of the present embodiments, an air outlet as described above is characterized in that the coupling mechanism is configured such that the flap conducts a rotating and sliding movement with respect to the main housing when being moved between the closed state and the opened state.

Commonly, the flap is rotated between two various orientations with respect to the air flow channel to seal or unseal the air flow channel. However, it has been found that with a rotational movement only, it is difficult to provide a configuration in which the front side of the air outlet forms a substantially flat and even surface in the closed state and in which the flap does not protrude from the main housing in the opened state of the flap. Combining the necessary rotational movement of the flap with a sliding (i.e. translatory) movement of the flap allows a configuration, in which the flap slides into the inside of the main housing when rotating from the closed state to the opened state. Thus, the flap does not protrude from the main housing in the opened state. During rotation of the flap from the opened state to the closed state, the flap rotates and at the same time slides back to a front opening of the main housing (i.e. the outlet of the air flow channel) to form a flat and even front surface in the closed state. The movement of the flap is realized by the coupling mechanism according to the present embodiments. The skilled artisan can consider various structural configurations for a coupling mechanism, which results in such a functionality. In such an air outlet according to the present embodiments, components or parts of the air outlet do neither in the opened state nor in the closed state of the flap protrude from the main housing, while at the same time, no undesired openings or recesses are formed on the front side of the air outlet in the closed state of the air outlet. Such a configuration according to the present embodiments is robust and functional and provides a smooth and well-designed appearance at the same time. Nevertheless, it is pointed to the fact that it is not necessary to provide the coupling mechanism in such a way that the flap is to be provided fully within the main housing in the closed state or that the flap forms together with the main housing a completely flat and even front surface of the air outlet. In this regard the skilled artisan has the freedom to adapt the claimed configurations to his demands and/or requirements. The basic idea of the present embodiments is, thus, that the rotational movement of the flap is combined with a sliding (i.e. translatory) movement to provide robust and functional overall configurations for air outlets.

The coupling mechanism comprises at least one sliding pin and at least one corresponding sliding groove. The sliding pin is provided to the flap and the sliding groove is provided on an inner surface of the main housing. In a mounted state of the coupling mechanism the sliding pin and the corresponding sliding groove are in engagement with each other. The sliding pin is configured to slide along the corresponding sliding groove during the movement of the flap between the closed state and the opened state with respect to the main housing. Thus, the flap can slide with the pin within the groove along the main housing while it rotates about the pin with respect to the main housing. Such a configuration is quite simple and reliable and realizes the combination of the rotational movement of the flap with a sliding movement thereof. To achieve an even more robust and stable configuration, the coupling mechanism can comprise two sliding pins and two corresponding sliding grooves, which are in particular provided on opposing sides of the flap or of the main housing, respectively.

Further, the sliding grooves extend in parallel with a longitudinal axis of the air flow channel within the main housing and the sliding pins extend radially with respect to the longitudinal axis of the air flow channel within the main housing. Thus, during the movement of the flap with respect to the housing the occurrence of undesired shearing forces within the coupling mechanism are prevented in an effective and reliable manner.

At least one sliding pin is provided with a rotation restriction arrangement. The rotation restriction arrangement is configured to restrict a rotation of the sliding pin within the sliding groove. In other words, the rotation restriction arrangement is configured such that the sliding pin can rotate within the sliding groove about a predefined angle only. Such a rotation restriction arrangement can be provided for example in the form of a protrusion protruding from the sliding pin in a radial direction with respect to a rotation axis of the sliding pin. Alternatively, or in addition thereto, a rotation restriction arrangement can comprise or can be formed of one or more flattened surfaces provided on the sliding pin hindering a rotation of the sliding pin within the sliding groove about more than a predetermined angle. To realize the intended function such configurations are simple in design but provide a reliable function. In particular, not only one of the provided sliding pins but all of them are provided with such a rotation restriction arrangement. Thus, an undesired rotation of the flap beyond a predetermined angle with respect to the main housing is prevented in a reliable manner. At the same time undesired shearing forces within the coupling mechanism are prevented or at least suppressed to a minimum.

The coupling mechanism comprises at least one rotation lever. The rotation lever has two lateral end sections. The first one of the end sections is coupled rotatably to the flap. The second one of the end sections is coupled rotatably to the main housing. Thus, the flap is rotated during a sliding movement along a longitudinal axis of the air flow channel with respect to the main housing. In other words, the rotation lever is provided in such a manner that a sliding movement of the flap with respect to the main housing results in a simultaneous rotational movement of the flap and vice versa. Providing such a rotation lever is a simple but reliable possibility for realizing the intended simultaneous rotation and sliding movement of the flap with respect to the main housing.

Further, the first rotation axis of the rotation lever at the first end section thereof is in parallel with the second rotation axis of the rotation lever at the second end section thereof. Thus, during the movement of the flap with respect to the main housing undesired shearing forces are prevented reliably. In particular, the sliding pins extend in parallel with the first and second rotation axes. This helps to further prevent undesired shearing forces within the air outlet during movement of the flap with respect to the main housing.

Further, the coupling mechanism comprises at least one, in particular two, hinges coupling the rotation lever to the main housing or to the flap, respectively. Common hinges are very simple and reliable possibilities to end up with the desired rotatability. In particular, at least one and perhaps all of the hinges is/are in the form of pin hinges. This particular design results in a simple and cheap overall configuration.

Further, the main housing or the flap is provided with a bearing arrangement. The rotation lever is coupled to the bearing arrangement. The main housing and the flap are provided with such bearing arrangements to which the rotation lever is coupled. Such bearing arrangements allow a highly flexible and practical coupling of the rotation lever to the flap or to the main housing, respectively. In particular, at least one of the bearing arrangements can be provided with two coupling arms, wherein the respective end section of the rotation lever is coupled rotatably to both coupling arms. This results in a robust and reliable configuration.

The air outlet further comprises a locking arrangement configured to lock the flap in its closed state and/or in its opened state. The locking arrangement prevents unintentional and/or autonomous closing and/or opening of the air outlet. In particular, the locking arrangement comprises at least one biasing configuration acting on the flap. The at least one biasing configuration acts on the flap in such a manner that a force is applied onto the flap to move the flap either from its closed state to its opened state or to the other state. With such a biasing configuration, unintentional and/or autonomous movements of the flap are prevented in a simple and reliable manner. Alternatively, or in addition thereto, the biasing configuration can be provided in such a manner that, when the flap is in a position close to any of its closed state and its opened state, the flap is biased into this closest state. Thus, an undesired positioning of the flap in an intermediate state close to the closed state or close to the opened state is prevented in a reliable manner.

Further, the locking arrangement comprises at least one biasing bar. The biasing bar is made of an elastic material and is coupled to the main housing as well as at least one corresponding locking protrusions provided on the flap. Such a biasing bar depicts an example for an appropriate biasing configuration. The locking protrusion is configured to interact with the biasing bar to realize the functionality of the locking arrangement and in particular also of the biasing member. This configuration is simple and robust but at the same time functional. Two biasing bars and two corresponding locking protrusions are provided to realize an even more robust and reliable overall configuration.

Further, the locking protrusions are provided with a first engaging surface and a second engaging surface. In the closed state of the flap, the biasing bars rest at least partly, and preferably flat, on the first engaging surface of the corresponding locking protrusion. In the opened state of the flap, the provided biasing bars rest at least partly flat, on a second engaging surface of the corresponding locking protrusions. In each of the two end states of the flap, the biasing force being generated by the biasing bars onto the locking protrusions is minimal, but in particular not Zero. This implementation provides a simple and cheap but at the same time reliable design.

Further, the locking protrusions are provided with a third engaging surface, wherein the third engaging surface is provided between the two other engaging surfaces, such for the movement of the locking protrusions with respect to the biasing bars between the two end states of the flap, the biasing bars are in contact with the third engaging surface. In particular the third engaging surface is formed continuously to other two engaging surfaces and has a curved shape. Thus, the biasing bars can slide smoothly with respect to the locking protrusions between the two end states. The third engaging surface is formed such that the biasing force generated by the respective biasing bar onto the locking protrusion is greater when the biasing bar contacts the third engaging surface, than for the two end states of the flap, in which the respective biasing bar rests on one of the first engaging surface and the second engaging surface.

The air outlet further comprises an attachment housing. The attachment housing is configured to be attached to a respective attachment surface or section of a heater and/or of an air conditioning unit, in particular of a heater or air conditioning unit of a recreational vehicle like a camper or caravan. The attachment housing and the main housing are coupled releasably to each other via an engagement arrangement. Thus, at first the attachment housing can be attached to the corresponding attachment surface or section without interference with the flap and/or the coupling mechanism. Then, the main housing with the flap and coupling mechanism can be coupled to the attachment housing. This results in an easy assembling process for the air outlet. Furthermore, by this configuration it is possible to replace the insert formed by the main housing with the flap and the coupling mechanism with a different insert. The different insert may have, for example, no flap and coupling mechanism but just a non-movable end cap with fixed ventilation openings. Such a configuration provides all the advantages mentioned above and is at the same time highly flexible.

Further, the engagement arrangement is a combination of latching elements or sections and threaded elements or sections on the attachment housing and on the main housing. The combination of latching elements or sections with the threaded elements or sections is configured such that the main housing is to be coupled to the attachment housing or uncoupled from the attachment housing by a two-step procedure. One step comprises engaging or disengaging the latching elements or sections. The other step comprises engaging or disengaging the threaded elements or sections with each other. With such a configuration, the main housing can be coupled to the attachment housing in a reliable and stable manner.

According to another aspect of the present embodiments, a heater or air conditioning unit—which in particular is provided for recreational vehicles like campers or caravans—comprises at least one of the above described air outlets. Thus, such an arrangement of a heater or air conditioning unit having at least one of the air outlets according to the present embodiments benefits from the technical effects of the air outlet according to the present embodiments.

According to a further aspect of the present embodiments, a recreational vehicle, like for example a camper or caravan, comprises at least one of an above described heater, air conditioning unit and/or above described air outlet. Thus, the technical effects of the air outlet according to the present embodiments can be achieved in corresponding vehicles.

According to a further aspect of the present embodiments, a method for operating one of the above described air outlets is proposed. The method according to the present embodiments comprises a step, in which to move the flap from the closed state to the opened state, the flap is pushed at a first operation section thereof such that the flap slides and rotates with respect to the main housing from the closed state to the opened state. To move the flap from the opened state to the closed state, the flap is pushed at a second operation section, which is different from the first operation section thereof, such that the flap slides and rotates back with respect to the main housing from the opened state to the closed state. The operation sections can be provided as distinct regions on the surface of the flap. Thus, it is easy to open and to close the air outlet according to the present embodiments.

The pushing force which has to be applied for moving the flap between its states must exceed a predetermined non-negligible threshold value to initiate a relative movement of the flap with respect to the main housing from its closed state and/or from its opened state. Thus, undesired unintentional and/or autonomous movements of the flap, for example caused by vibrations of the recreational vehicle while driving or even by gravity, are prevented reliably.

According to another aspect of the present embodiments, a method for attaching any of the above described air outlets to a desired attachment surface or section comprises attaching an attachment housing of the air outlet to the respective attachment surface with a corresponding attachment structure, and coupling the main housing to the attachment housing with a combined process of engaging latching elements or sections and engaging threaded elements or sections of the main housing with corresponding elements or sections on the attachment housing. Thus, the main housing is coupled to the attachment housing in a robust and reliable manner.

For engaging the main housing with the attachment housing, at first latching elements or sections of the main housing are engaged with corresponding latching elements or sections of the attachment housing. The first latching elements or sections of the main housing are engaged with corresponding latching elements or sections of the attachment housing with a longitudinal movement of the main housing with respect to the attachment housing along the longitudinal axis of the main housing. The longitudinal axis of the main housing is aligned with the longitudinal axis of the attachment housing. Then, threaded elements or sections of the main housing are engaged with corresponding threaded elements or sections of the attachment housing. The threaded elements or sections of the main housing are engaged with corresponding threaded elements or sections of the attachment housing with a rotational movement of the main housing with respect to the attachment housing about the common longitudinal axis of the main housing and of the attachment housing. Thus, the main housing is coupled to the attachment housing in a robust and reliable manner.

According to a further aspect of the present embodiments, a method for converting any of the above described air outlets is proposed. The method for converting any of the above described air outlets according to the present embodiments comprises decoupling the main housing with the flap and the coupling mechanism, in a configuration in which the main housing of the air outlet is coupled to a corresponding attachment housing of the air outlet, from the attachment housing and replacing it by another component having an alternative main housing. The alternative main housing is coupled to the attachment housing and comprises a non-movable end cap. The non-movable end cap has ventilation openings. Thus, the air outlet can be adapted to various situations and demands by replacing the inserted main housing with its thereto coupled components in a simple and easy manner.

BRIEF DESCRIPTION OF THE DRAWINGS

These and other features of the various embodiments will become more apparent from the following detailed description of non-limiting exemplary embodiments of the present embodiments, with reference to the accompanying drawings, in which:

FIG. 3 is another spatial view of the air outlet of FIGS. 1 and 2 (from behind along a longitudinal axis of the air outlet);

FIG. 4A is a spatial view of the flap and of the rotation lever of the air outlet of FIGS. 1 to 3 (from diagonally behind);

FIG. 4B is an enlarged sectional view of one of the sliding pins of FIG. 4A (along its rotation axis);

DETAILED DESCRIPTION

In the following, a first exemplary embodiment of an air outlet 1 according to the present invention is described with reference to FIGS. 1 to 4B.

Figure 1:
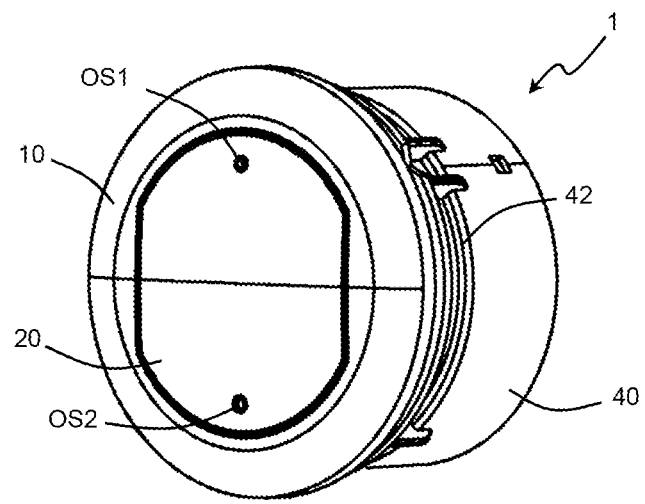
FIG. 1 is a first spatial view of an air outlet according to a first exemplary embodiment (from diagonally in front)
Figure 2:
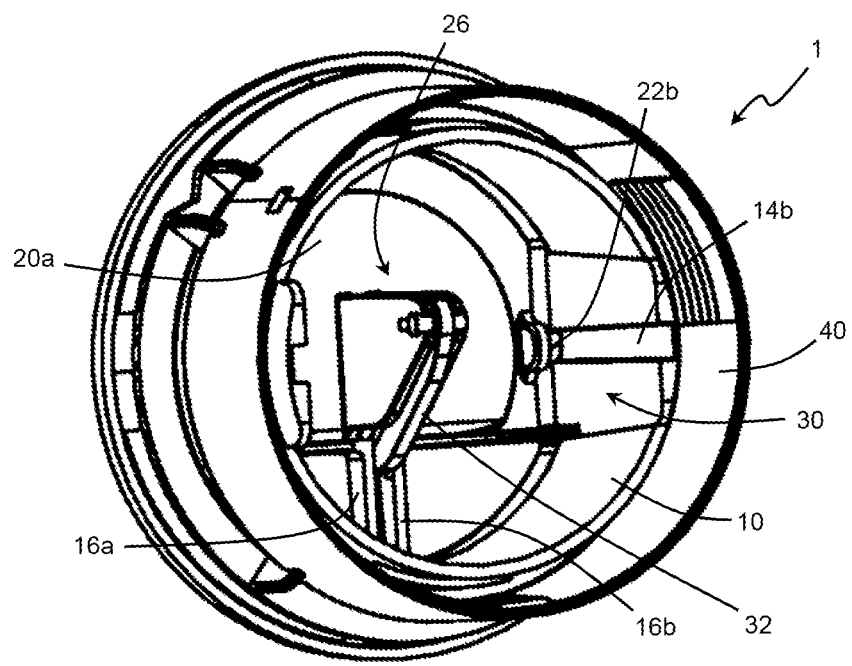
FIG. 2 is a further spatial view of the air outlet of FIG. 1 (from diagonally behind)

The air outlet comprises a main housing 10, a flap 20, a coupling mechanism 30 and an attachment housing 40. The main housing 10 has a tubular shape and forms in its inner an air flow channel. The flap 20 is coupled via the coupling mechanism 30 to the main housing 10 in a movable manner and configured such that it can seal (i.e. close) the air flow channel within the main housing 10. The coupling mechanism 30 is configured such that the flap 20 can be moved with respect to the main housing 10 between a closed state and an opened state. In the closed state the flap 20 closes or seals the air flow channel. In the opened state the air flow channel is open and air is allowed to pass through the air flow channel. The concrete configuration of the coupling mechanism 30 and its components will be described in more detail later. The main housing 10 is coupled via an engagement arrangement to the attachment housing 40. the attachment housing 40 is provided with a tubular shape. Each of the main housing 10, the air flow channel and the attachment housing 40 has a longitudinal axis LA. In the assembled state of the air outlet 1, which is illustrated in FIGS. 1 to 3, the longitudinal axis LA of the main housing 10 corresponds to the longitudinal axis LA of the air flow channel and further corresponds to a longitudinal axis LA of the attachment housing 40, as is particularly illustrated in FIG. 3.

The attachment housing 40 comprises on its outside surface with respect to its longitudinal axis LA. The attachment housing 40 can be coupled to an attachment surface or section of for example a heater or of an air conditioning unit with the attachment structure 42. The air outlet 1 is to be attached to the attachment structure 42. As the skilled artisan knows various possibilities for implementing such an attachment structure 42, further details with regard to a concrete implementation thereof are omitted here.

Figure 5A:
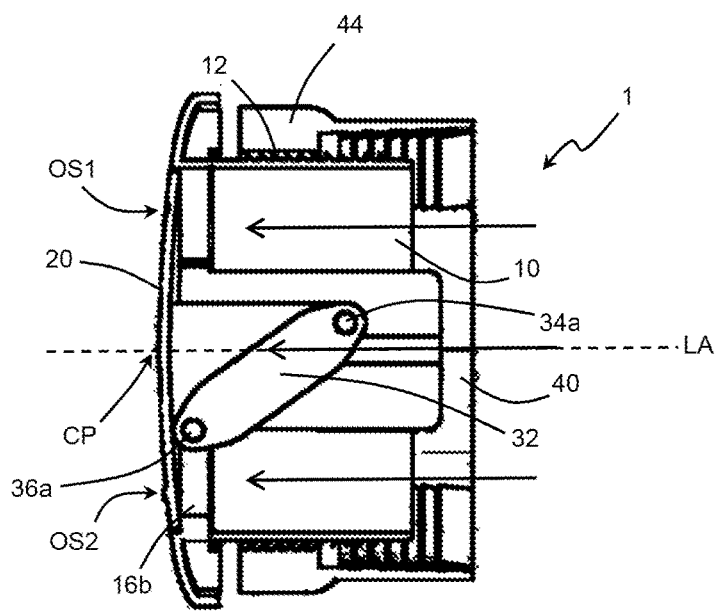
FIGS. 5A to 5B are cross-sectional side views of the air outlet of FIGS. 1 to 3 in the closed state (see FIG. 5A), in an intermediate state (see FIG. 5B) and in the opened state (see FIG. 5C) thereof.
Figure 5B:
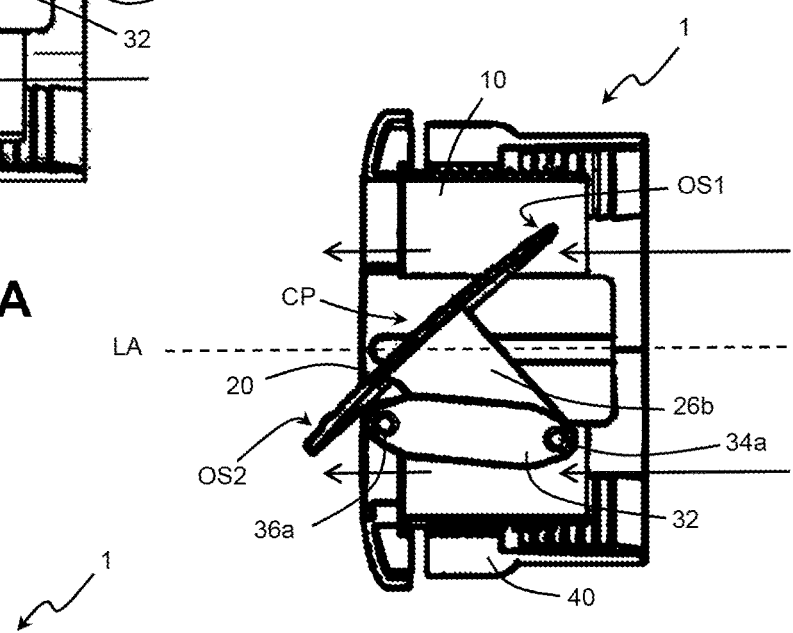
Figure 9:
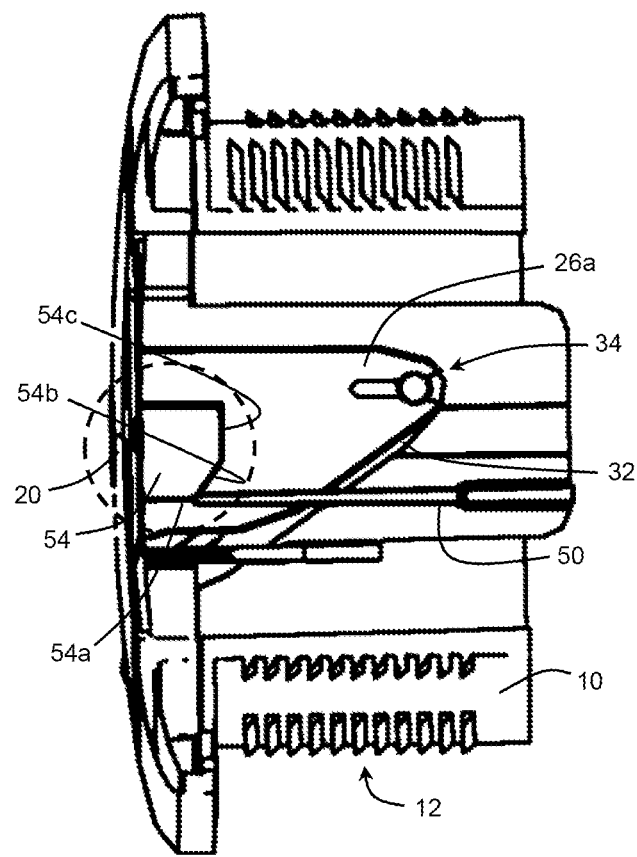
FIG. 9 is a cross-sectional side view of the air outlet of FIG. 8.

On the inside surface of the attachment housing 40, an engagement configuration is provided. The engagement configuration is realized in the form of an intersected internal thread 44 (FIG. 5B). On its outside surface and with respect to the longitudinal axis LA the main housing 10 has a counter engagement configuration. The counter engagement configuration is provided in the form of an intersected external thread 12. The intersections in the internal thread 44 of the attachment housing 40 and the intersections in the external thread 12 of the main housing 10 extend along the longitudinal axis LA. The intersections in the internal thread 44 of the attachment housing 40 and the intersections in the external thread 12 (FIG. 9) are provided in such a manner that the main housing 10 can be inserted or removed from the attachment housing 40 with a transversal movement of the main housing 10 with respect to the attachment housing 40 along the longitudinal axis LA in a first relative orientation between the main housing 10 and the attachment housing 40. During insertion of the main housing 10 into the attachment housing 40, the main housing 10 is rotated about the central longitudinal axis LA with respect to the attachment housing 40 to engage the external thread 12 of the main housing 10 with the internal thread 44 of the attachment housing 40. In this state, the engaged threads 12 and 44 prevent a translational movement of main housing 10 with respect to the attachment housing 40. During decoupling the main housing 10 from the attachment housing 40, the main housing 10 is rotated at first with respect to the attachment housing 40 to rotate the main housing 10 and the attachment housing 40 back into the original relative orientation in which the external thread 12 of the main housing 10 is aligned with the intersections in the internal thread 44 of the attachment housing 40 and vice versa. Then, the main housing 10 is removed from the attachment housing 40 with a translational movement of the main housing 10 along the central longitudinal axis LA. Here, the protrusions of the threads 12 and 44 depict threaded elements or sections in the sense of one embodiment. The intersections in the threads 12 and 44 depict latching elements or sections in the sense of one present embodiment.

However, also other configurations for coupling the main housing 10 to the attachment housing 40 in an expedient manner are conceivable. For example, simple non-intersected threads engaging with each other can be provided, if desired.

Figure 6:
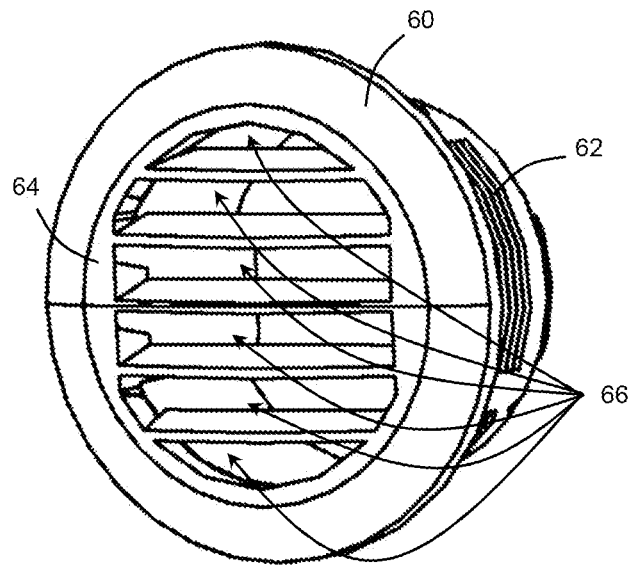
FIG. 6 is a first spatial view of an alternative main housing having a non-movable end cap (from diagonally in front)
Figure 7:
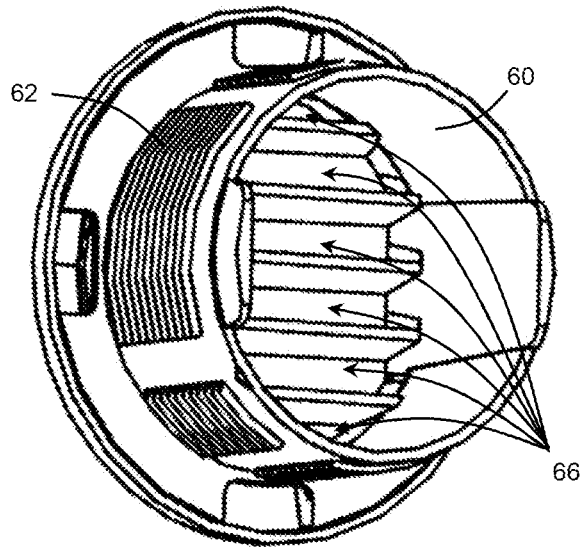
FIG. 7 is a second spatial view of the alternative main housing of FIG. 6 (from diagonally behind)
Figure 8:
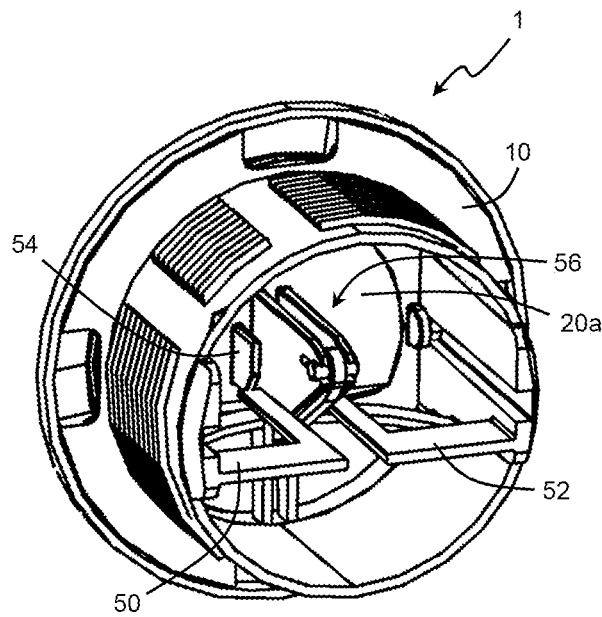
FIG. 8 is a partial spatial view of an air outlet according to a further exemplary embodiment of the present embodiments.

The main housing 10 with the flap 20 and the coupling mechanism 30 is coupled to the attachment housing 40 via the engagement arrangement with the threads 12 and 44 in a releasable manner. Thus, the main housing 10 with the flap 20 and the coupling mechanism 30 can be replaced with an alternative main housing 60 in a simple and easy manner, if desired. An example for such an alternative main housing 60 is for example illustrated in FIGS. 6 and 7. The alternative main housing 60 comprises an intersected external thread 62. The intersected external thread 62 of the alternative main housing 60 corresponds to the external thread 12 provided on the main housing 10. The alternative main housing 60 has in principle the same overall shape as the main housing 10. But instead of the flap 20 and the coupling mechanism 30, the alternative main housing 60 is provided with a non-movable end cap 64. The non-movable end cap 64 has several ventilation openings 66 which limit the cross section of the provided air flow channel but cannot be varied in any manner. In the present embodiment the non-movable end cap 64 has six ventilation openings 66 in form of slits. However, neither the number nor the shape of the ventilations openings 66 is essential to the invention and can be varied upon the specific needs and requirements of the user. According to some embodiments, the possibility to replace the main housing 10 with the flap 20 and the coupling mechanism 30 by such a simple alternative main housing 60 allows to save costs for forming an air outlet 1 where it is not necessary to be able to close and to open the air flow channel. Furthermore, the gained overall configuration is highly flexible as the provided main housing 10 and 60 can be switched in an easy manner, if and whenever desired.

Figure 5C:
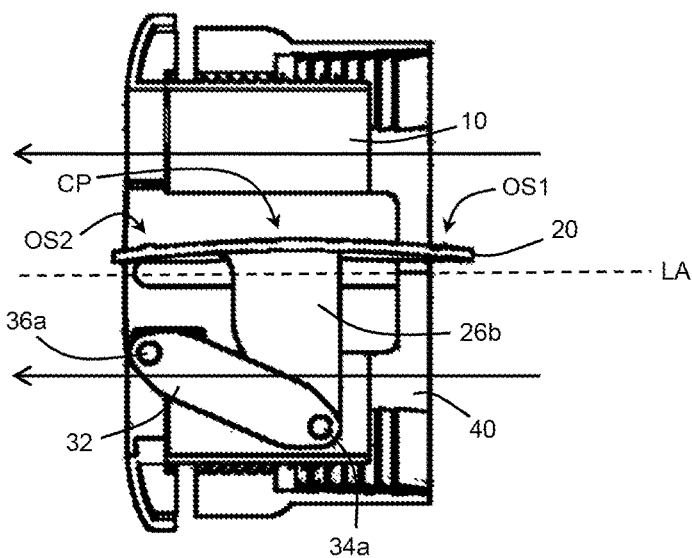

Referring now again to the configuration illustrated in FIGS. 1 to 4B, the coupling mechanism 30 is configured such that the flap 20 can be moved with respect to the main housing 10. The flap 20 can be moved with respect to the main housing 10 in a sliding and rotating manner. In other words, the coupling mechanism 30 is configured such that the flap 20 conducts a rotating and sliding movement with respect to the main housing 10 when being moved between its closed state and its opened state. This movement can be seen in FIGS. 5A to 5C. FIG. 5A illustrates a cross-sectional view of the air outlet 1 of FIGS. 1 to 3 in the closed state, in which the flap 20 seals the air flow channel (see the arrows). FIG. 5C illustrates a cross-sectional view of the air outlet 1 of FIGS. 1 to 3 in the opened state, in which the flap 20 does not seal the air flow channel (see the arrows). FIG. 5C illustrates an intermediate state of the flap 20 in a state between its closed state of FIG. 5A and its opened state of FIG. 5C. In this state, the air flow channel is partly blocked (see the arrows).

As illustrated by the different states of the flap displayed in FIGS. 5A to 5C, during a movement of the flap 20 between its closed state of FIG. 5A and its opened state of FIG. 5C a center point CP of the flap 20 moves or slides along the longitudinal axis LA. Simultaneously, a first operation section OS1 depicting a specific area on the flap 20 and a second operation section OS2 depicting another specific area on the flap 20 rotate about the center point CP of the flap 20. Thus, the flap 20 conducts a combined rotating and sliding movement when moving between its closed state and its opened state. In the present embodiment, the coupling mechanism 30 and the first operating section OS1 are provided in such a manner that the flap 20 can be moved from the closed state of FIG. 5A to the opened state of FIG. 5C (via the intermediate state of FIG. 5B) by applying a predetermined amount of force onto the first operation section OS1. In other words, by pushing the first operation section OS1 with the predetermined amount of force the flap 20 moves from the closed state of FIG. 5A to the opened state of FIG. 5C (via the intermediate state of FIG. 5B). Furthermore, the coupling mechanism 30 and the second operating section OS2 are provided in such a manner that the flap 20 can be moved from the opened state of FIG. 5C to the closed state of FIG. 5A (via the intermediate state of FIG. 5B) by applying a predetermined amount of force onto the second operation section OS2. In other words, by pushing the second operation section OS2 with the predetermined amount of force the flap 20 moves from the open state of FIG. 5C to the closed state of FIG. 5A (via the intermediate state of FIG. 5B).

The structural configuration of the coupling mechanism 30 of the illustrated embodiment will be described in the following in more detail.

As can be seen in FIGS. 3, 4A and 4B, sliding pins 22a and 22b are coupled to or provided on the flap 20. A first sliding pin 22a is provided on the outer circumference of the flap 20 on one side of the flap 20 with respect to the longitudinal axis LA of the air outlet 1. A second sliding pin 22b is provided on the outer circumference of the flap 20 on the opposed side of the flap 20 with respect to the longitudinal axis LA of the air outlet 1. The first and the second sliding pins 22a and 22b extend radially with respect to the longitudinal axis LA. On the inner surface of the main housing 10 a corresponding sliding groove 14a and 14b is provided for each of the first and second sliding pins 22a and 22b. As for example can be seen in FIG. 2, each sliding groove 14a and 14b (here the second sliding groove 14b) is configured such that the respective sliding pin 22a or 22b (here the second sliding pin 22b) is engaged with the corresponding sliding groove 14a or 14b, respectively. The sliding pins 22a or 22b are engaged with the sliding grooves 14a or 14b such that the sliding pins 22a and 22b can slide along the sliding grooves 14a and 14b along the longitudinal axis LA and can rotate within the sliding grooves 14a and 14b about a rotation axis RA extending perpendicular with respect to the longitudinal axis LA (see FIG. 3).

Although, terminologically the sliding pins 22a and 22b as well as the sliding grooves 14a and 14b are elements of the coupling mechanism 30, they can be provided integrally with the flap 20 and/or with the main housing 10, as it is the case in the displayed embodiment. However, within the scope of the present embodiments also other configurations are conceivable, in particular in which these elements are coupled to the flap 20 and to the main housing 10. Furthermore, within the scope of the present embodiments the term "coupling mechanism 30" does not necessarily describe one arrangement in which several components are connected to each other. The term "coupling mechanism 30" can comprise several independent components or groups of components, as it is the case in the displayed embodiment. Nevertheless, also integrally formed coupling mechanisms 30 are possible within the scope of the present invention.

To stabilize and restrict the rotational movement of the sliding pins 22a and 22b within the respective sliding grooves 14a and 14b to a predetermined angle, each sliding pin 22a and 22b comprises a rotation restriction arrangement, as is displayed in the illustrated embodiment. As can be seen in FIGS. 4A and 4B, here, the rotations restriction arrangement on the first sliding pin 22a is provided in the form of two flattened surfaces 22a1 and 22a2. The two flattened surfaces 22a1 and 22a2 are provided on a circumference of the respective sliding pin 22a with respect to the rotation axis RA. The first flattened surface 22a1 is configured to contact a corresponding side wall of the respective sliding groove 14a in the closed state of the flap 20. The second flattened surface 22a2 is configured to contact the other side wall of the respective sliding groove 14a in the opened state of the flap 20. The two flattened surfaces 22a1 and 22a2 are provided on the corresponding sliding pin 22a. The two flattened surfaces 22a1 and 22a2 are oriented with respect to each other such that they do not hinder a rotation of the sliding pin 22a and thus of the flap 20 during a movement between its closed and its opened state but such that they hinder a further rotation of the sliding pin 22a and thus of the flap 20 beyond its closed state and beyond its opened state. For this embodiment, the flattened surfaces 22a1 and 22a1 extend perpendicular with respect to each other and protrude from a circular cross section of the respective sliding pin 22a, as for example is illustrated in FIG. 4B. Such, the rotation restriction arrangement with the flattened surfaces 22a1 and 22a2 enables the movement of the flap 20 with respect to the main housing 10 as illustrated in FIGS. 5A to 5C but restricts the rotational movement beyond this range. In the illustrated embodiment, both sliding pins 22a and 22b are provided with such flattened surfaces.

As can be seen best in FIGS. 2 and 4A, the coupling mechanism 30 of the air outlet 1 of the illustrated embodiment further comprises a rotation lever 32. The rotation lever 32 is provided to combine the sliding movement with the rotating movement of the flap 20 in a reliable manner, as will be described in more detail below. The rotation lever 32 has a first lateral end section and a second lateral end section. The first lateral end section of the rotation lever 32 is coupled to a first bearing arrangement 26 provided on the back surface 20a of the flap 20 via a first pin hinge 34. The first bearing arrangement 26 comprises two first coupling arms 26a and 26b. One end of each of the first coupling arms 26a and 26b is coupled to the back surface 20a of the flap 20. The first coupling arms 26a and 26b extend from the back surface 20a of the flap 20 in parallel with respect to each other and perpendicular along the longitudinal axis LA. In the present embodiment, the first coupling arms 26a and 26b are provided in the form of relatively flat substantially two-dimensional components. The other ends of the first coupling arms 26a and 26b are provided with an engagement structure. The engagement structure is configured to be engaged with a first hinge pin 34a provided through a corresponding pin opening (not illustrated) of the rotation lever 32. Thus, the rotation lever 32 can rotate with respect to the flap 20. The second lateral end section of the rotation lever 32 is coupled via a second pin hinge 36 with a second hinge pin 36a to a second bearing arrangement 16 provided within the main housing 10. The two hinge pins 34a and 36a can be seen for example in in FIGS. 5A to 5C. The second bearing arrangement 16 comprises two second coupling arms 16a and 16b. Each of two second coupling arms 16a and 16b has a "L"-shape and is coupled to the main housing 10 at its end sections. Each of the second coupling arms 16a and 16b has an intermediate section. The intermediate section of each of the second coupling arms 16a and 16b is coupled to the second end section of the rotation lever 32 via the second pin hinge 36 in a manner quite similar to the first pin hinge 34. To prevent the occurrence of shearing forces during movement of the flap 20 with respect to the main housing 10, the rotation axes of the pin hinges 34 and 36 as well as of the sliding pins 22a and 22a are oriented in parallel with respect to each other, while the sliding grooves 14a and 14b extend in parallel with respect of the longitudinal axis LA. Thus, the rotation lever 32 can also rotate with respect to the main housing 10. At the same time, the rotation lever 32 restricts the movement of the flap 20 with respect to the main housing 10 in such a manner that during a sliding movement of the flap 20 with respect to the main housing 10 along the sliding grooves 14a and 14b the flap 20 is forced to rotate about the sliding pins 22a and 22b about the rotation axis RA.

Another exemplary embodiment for an air outlet 1 according to the present invention is illustrated by reference to FIGS. 8 to 10D. The air outlet 1 according to this exemplary embodiment has in principle the same structural configuration as the air outlet 1 as illustrated in FIGS. 1 to 5C. In the exemplary embodiment of FIGS. 8 to 10D, the corresponding attachment housing was omitted but the air outlet 1 has all the structural components and configurations described above with respect to the air outlet 1 as illustrated in FIGS. 1 to 5C. For the sake of brevity, a repetition of the concrete description of these features described above is not provided here.

The structural difference between the configuration illustrated in FIGS. 1 to 5C with respect to the configuration of FIGS. 8 to 10D is that in the latter a further locking arrangement is provided. The further locking arrangement comprises a biasing configuration. The biasing configuration is formed of two biasing bars 50 and 52 and two corresponding locking protrusions 54 and 56. The biasing bars 50 and 52 are provided on the inner surface of the main housing 10. The biasing bars 50 and 52 are essentially flat components and have an "L"-shape. The biasing bars 50 and 52 protrude into the air flow channel within the main housing 10. In the present embodiment, the biasing bars 50 and 52 are formed integrally with the main housing 10 of a suitable material, like for example plastic material, such that the biasing bars 50 and 52 have a specific elasticity. The locking protrusions 54 and 56 are provided on the back surface 20a of the flap 20 just adjacent to the first coupling arms 26a and 26b. The locking protrusions 54 and 56 are provided in the form of plate like two dimensional components.

As can be seen best in FIGS. 10A to 10D each of the locking protrusions (here in particular locking protrusion 54) comprises several, here in particular three, distinct engaging surfaces 54a, 54b and 54c.

Here, the locking protrusion 54 comprises a first engaging surface 54a, a second engaging surface 54c and a third engaging surface 54b. The first engaging surface 54a and the second engaging surface 54c are both flat and are oriented more or less perpendicular with respect to each other. The third engaging surface 54b is provided between the first engaging surface 54a and the second engaging surface 54c and couples them to each other. Here, the third engaging surface 54b is formed continuously on one side thereof to the first engaging surface 54a and on the other side thereof to the second engaging surface 54c and has a curved, in particular found, shape seen along the rotation axis RA.

Figure 10A:
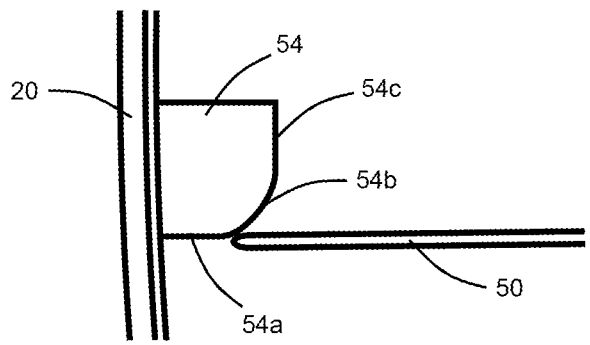
FIGS. 10A-10D are enlarged side views of the first locking protrusion of FIGS. 8 and 9 interacting with the respective biasing bar in various moments during a movement of the flap with respect to the main housing.
Figure 10B:
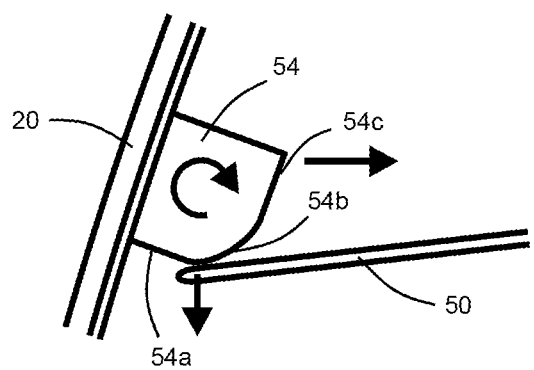
Figure 10C:
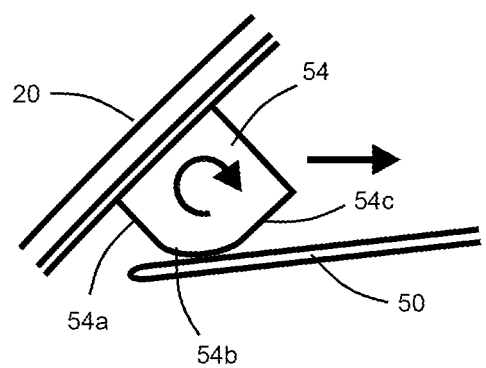
Figure 10D:
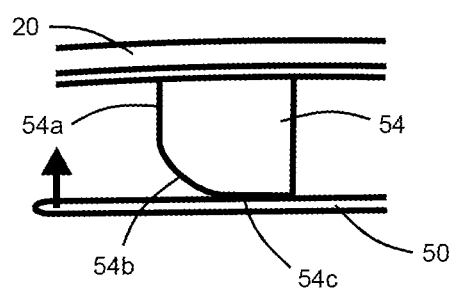

The biasing bars 50 and 52 as well as the locking protrusions 54 and 56 are configured such that in the closed state of the flap 20, the first engaging surface 54a rests in particular flat on the corresponding biasing bar 50 or vice versa (see FIG. 10A). Moreover, the biasing bars 50 and 52 as well as the locking protrusions 54 and 56 are configured such that in various intermediate states of the flap 20 between its closed state and its opened state, the third engaging surface 54b rests in particular flat on the corresponding biasing bar 50 or vice versa (see FIGS. 10B and 10C). Finally, the biasing bars 50 and 52 as well as the locking protrusions 54 and 56 are configured such that in the opened state of the flap 20, the second surface 54c rests in particular flat on the corresponding biasing bar 50 or vice versa (see FIG. 10D).

The biasing bars 50 and 52 as well as the locking protrusions 54 and 56 are configured such that a biasing force generated by the biasing bars 50 and 52 onto the locking protrusions 54 and 56 is minimal for the opened state and for the closed state of the flap 20. However, in both of these end states for the flap, the generated biasing force should be not Zero such that the flap 20 is stabilized at the respective end state preventing wobbling of the flap in its end states. For the intermediate states of the flap 20, the generated biasing force is increased with respect to the two end states of the flap 20 such that the flap 20 tends towards the two end states thereof. This increased biasing force results from an increased deformation of the biasing bars 50 and 52 by the locking protrusions 54 and 56 when then the biasing bars 50 and 52 are in contact with the respective third engaging surfaces 54b.

Forming the third engaging surface 54b continuously i.e. flat to the two other engaging surfaces 54a and 54c and providing the third engaging surface 54b with a curved, in particular round shape, seen along rotation axis RA results in a continuous development of the generated biasing force at first increasing and then decreasing during a movement of the flap 20 between its two end states. This results in a quite stable and reliable overall configuration.

Finally, it is pointed to the fact that the herein described embodiments depict various implementations of the present embodiments but that the scope of protection is only defined by the accompanying claims and not limited by the above given explanations with respect to the exemplary embodiments.

Besides, it is pointed to the fact that the accompanying claims refer not only to an appropriate air outlet but also to a heater or air conditioning unit with such an air outlet as well as to a recreational vehicle having such a heater, air conditioning unit and/or air outlet. Furthermore, the claims refer to various above described (implicitly) methods related closely to the air outlet according to the present embodiments.

REFERENCE NUMERALS 1 air outlet
10 main housing
12 intersected external thread
14a first sliding groove
14b second sliding groove
16a first one of second coupling arms
16b second one of second coupling arms
20 flap
20a back surface
22a first sliding pin
22a1 first flattened surface
22a2 second flattened surface
22b second sliding pin
26 first bearing arrangement
26a first one of first coupling arms
26b second one of first coupling arms
30 coupling mechanism
32 rotation lever
34 first pin hinge
34a first hinge pin
36 second pin hinge
36a second hinge pin
40 attachment housing
42 attachment structure
44 intersected internal thread
50 first biasing bar
52 second biasing bar
54 first locking protrusion
56 second locking protrusion
54a first engaging surface
54b third engaging surface
54c second engaging surface
60 alternative main housing
62 intersected external thread
64 end cap
66 ventilation openings
CP center point
LA longitudinal axis
OS1 first operating section
OS2 second operating section
RA rotation axis

The invention claimed is:

1. An air outlet, in particular for heaters or air conditioning units for recreational vehicles, comprising:
a main housing, wherein the main housing forms an air flow channel, said main housing defining an opening;
a flap suitable to seal the air flow channel in the main housing, wherein said flap is seated within the opening defined by said main housing in a closed state; and
a coupling mechanism coupling the flap to the main housing in a movable manner such that the flap can be moved with respect to the main housing between said closed state, in which the flap seals the air flow channel, and an opened state, in which the flap does not seal the air flow channel and said flap is substantially within said air flow channel, said coupling mechanism being located within said air flow channel;
wherein the coupling mechanism is configured such that the flap conducts a rotating and sliding movement within the main housing when being moved between the closed state and the opened state.

2. The air outlet of claim 1, wherein the coupling mechanism comprises at least one sliding pin and at least one corresponding sliding groove, and
wherein the at least one sliding pin is provided to the flap and the at least one corresponding sliding groove is provided on an inner surface of the main housing in such a manner that the at least one sliding pin and the at least one corresponding sliding groove are in engagement with each other and that the at least one sliding pin slides along the at least one corresponding sliding groove during the movement of the flap between the closed state and the opened state within the main housing.

3. The air outlet of claim 2, wherein the at least one corresponding sliding groove extends in parallel with a longitudinal axis (LA) of the air flow channel within the main housing, and
wherein the at least one sliding pin extends radially with respect to the longitudinal axis (LA) of the air flow channel within the main housing.

4. The air outlet of claim 2, wherein the at least one sliding pin is provided with a rotation restriction arrangement, in the form of a protrusion and/or one or more flattened surfaces, and
wherein the rotation restriction arrangement is configured to restrict a rotation of the at least one sliding pin within the at least one corresponding sliding groove.

5. The air outlet of claim 2, wherein the coupling mechanism comprises at least one rotation lever,
wherein the at least one rotation lever has two lateral end sections, and
wherein a first one of the end sections is coupled rotatably to the flap and a second one of the end sections is coupled rotatably to the main housing, such that the flap is rotated during the sliding movement along a longitudinal axis (LA) of the air flow channel with respect to the main housing.

6. The air outlet of claim 5, wherein a first rotation axis of the at least one rotation lever at the first end section thereof is in parallel with a second rotation axis of the at least one rotation lever at the second end section thereof, and
wherein the at least one sliding pin extends in parallel with the first and second rotation axes.

7. The air outlet of claim 5, wherein the coupling mechanism comprises at least one hinge, in the form of pin hinges, coupling the at least one rotation lever to the main housing and/or to the flap.

8. The air outlet of claim 5, wherein the main housing and/or the flap is/are provided with an integrally formed, bearing arrangement,
wherein the at least one rotation lever is coupled to the bearing arrangement,
wherein the bearing arrangement comprises two coupling arms, and
wherein the respective end section of the at least one rotation lever is coupled rotatably to the two coupling arms.

9. The air outlet of claim 1, wherein the air outlet further comprises a locking arrangement configured to lock the flap in said closed state and/or in said opened state, and wherein the locking arrangement comprises at least one biasing configuration acting on the flap in such a manner that a distinct non-negligible force has to be applied onto the flap to move the flap from said closed state and/or said opened state to the other state thereof and/or in such a manner that, when the flap is close to any one of said closed state and said opened state, the flap is biased into this closest state.

10. The air outlet of claim 9, wherein the locking arrangement comprises at least one biasing bar made of elastic material and coupled to the main housing as well as at least one corresponding locking protrusion provided on the flap, and wherein the at least one corresponding locking protrusion is configured to interact with the corresponding at least one biasing bar to realize the functionality of the locking arrangement.

11. The air outlet of claim 10, wherein the at least one corresponding locking protrusion is provided with a first engaging surface and a second engaging surface, and wherein in the closed state of the flap, the at least one biasing bar rests at least partly on the first engaging surface of the at least one corresponding locking protrusion, and in the opened state of the flap, the at least one biasing bar rests at least partly, and preferably flat, on the second engaging surface of the at least one corresponding locking protrusion, such that in each of said two states of the flap, the biasing force generated by the at least one biasing bar onto the at least one corresponding locking protrusion is minimal, but in particular never zero.

12. The air outlet of claim 11, wherein the at least one corresponding locking protrusion is provided with a third engaging surface, wherein the third engaging surface is provided between the two other engaging surfaces, continuously formed to them and having a curved shape, such for the movement of the at least one corresponding locking protrusion with respect to the at least one biasing bar between the opened and closed states of the flap, the at least one biasing bar is in contact with the third engaging surface, and wherein the third engaging surface is formed such that the biasing force generated by the respective biasing bar onto the at least one corresponding locking protrusion is greater when the biasing bar contacts the third engaging surface, than for the two end states of the flap, in which the biasing bar rests on one of the first engaging surface and the second engaging surface.

13. The air outlet of claim 1, wherein the air outlet further comprises an attachment housing, wherein the attachment housing is configured to be attached to a respective attachment surface or section of a heater and/or of an air conditioning unit, in particular of a heater or air conditioning unit of a recreational vehicle, and wherein the attachment housing and the main housing are coupled releasably to each other via an engagement arrangement.

14. The air outlet of claim 13, wherein the engagement arrangement comprises threaded elements on the attachment housing and on the main housing, wherein the combination of the threaded elements is configured such that the main housing is coupled to the attachment housing or uncoupled from the attachment housing.

15. A method for attaching an air outlet to a desired attachment surface or section, comprising the steps of:

attaching an attachment housing of the air outlet to a respective attachment surface with a corresponding attachment structure, and coupling a main housing of the air outlet to the attachment housing of the air outlet with threads corresponding to each of the main housing and the attachment housing, wherein said main housing comprises a flap that is substantially within an air flow channel when in an open position, and a coupling mechanism that is located within said air flow channel of said main housing, and wherein said flap is flush with an opening in a closed position; and wherein the coupling mechanism is configured such that the flap conducts a rotating and sliding movement within the main housing when being moved between the closed position and the open position.

16. The method according to claim 15, wherein an applied pushing force must exceed a predetermined non-negligible threshold value to initiate a relative movement of the flap with respect to the main housing from said closed position and/or from said opened position.

* * * * *